(No Model.)
E. N. GILFILLAN.
WEIGHING SCALE.
No. 596,154. Patented Dec. 28, 1897.
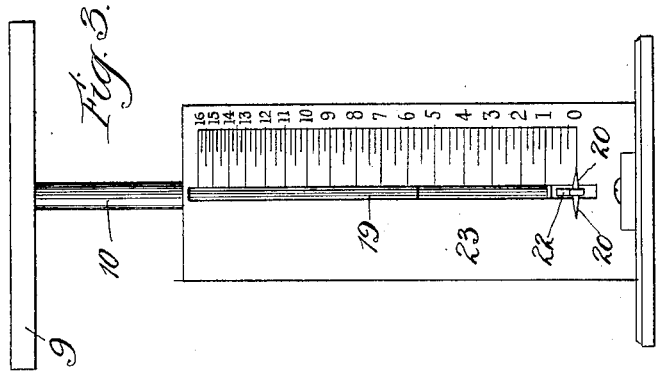
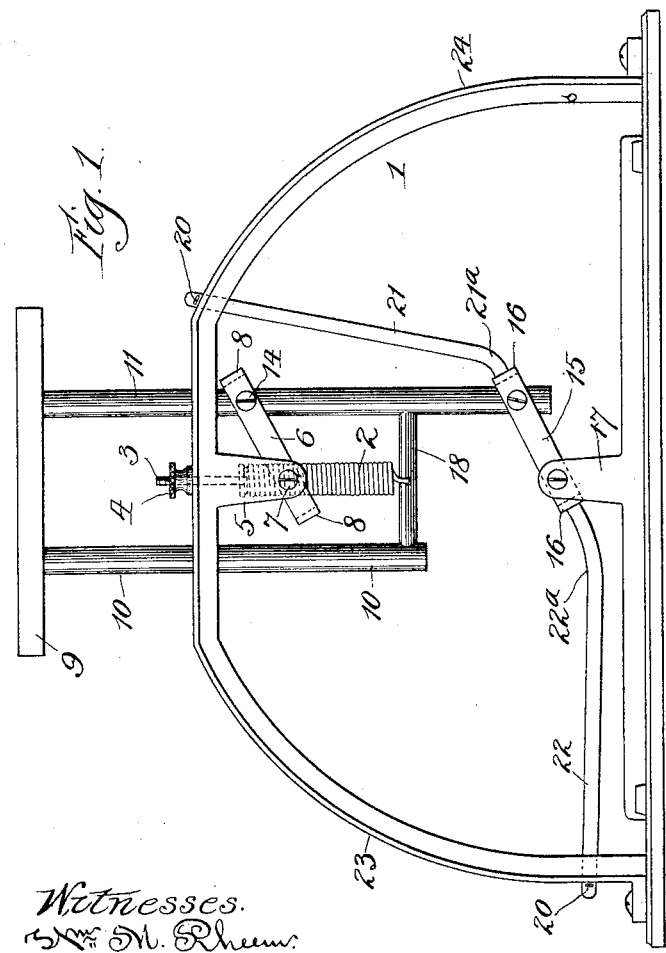
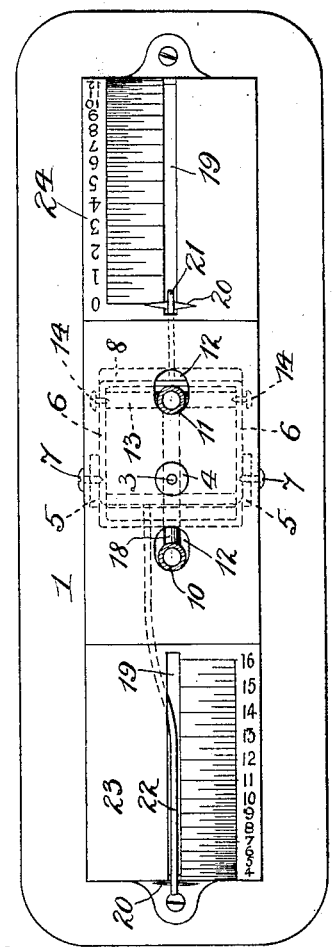
Witnesses.
Inventor
E. N. Gilfillan
by Elliott & Hopkins Att'ys

UNITED STATES PATENT OFFICE.

ESSINGTON N. GILFILLAN, OF CHICAGO, ILLINOIS, ASSIGNOR TO THE GILFILLAN SCALE AND HARDWARE COMPANY, OF SAME PLACE.

WEIGHING-SCALE.

SPECIFICATION forming part of Letters Patent No. 596,154, dated December 28, 1897.

Application filed April 13, 1896. Serial No. 587,370. (No model.)

*To all whom it may concern:*

Be it known that I, ESSINGTON N. GILFILLAN, a citizen of the United States, residing at Chicago, in the county of Cook and State of Illinois, have invented certain new and useful Improvements in Weighing-Scales, of which the following is a full, clear, and exact specification.

My invention relates to weighing-scales, and more particularly to that type in which the scale-pan is located above the spring as contradistinguished from that in which the scale-pan is suspended directly from and below the spring. It is well known that in scales of this character the weight to be weighed must be placed directly over the pan-supporting stem if its weight is to be determined with accuracy, because when placed to one side of the supporting-stem, so as to produce lateral or torsional strain thereon, the increased friction on the pivots which support the stem causes the scale to vary. The object of my invention, therefore, is to provide improved and simple means for reducing this variation to the minimum.

Another object of my invention is to provide simple and improved means for causing the scale to indicate the weight on both sides of its frame, whereby the customer and the dealer may read the weight simultaneously.

With these ends in view my invention consists in certain features of novelty by which the said objects and certain other objects hereinafter appearing are attained, all as fully described with reference to the accompanying drawings, and more particularly pointed out in the claims.

In the said drawings, Figure 1 is a side elevation of my improved scale with one of the inclosing plates of the frame removed, showing the internal mechanism. Fig. 2 is a plan view thereof with the scale-pan removed, and Fig. 3 is an end view.

In carrying out my invention I prefer to mount the operating mechanism within a box or casing 1, from the upper side of which is suspended the spring 2 of the spiral or any other suitable form, the upper end of the spring being attached to the casing by means of a stem 3, which passes therethrough and upon which is turned a thumb-nut 4, whereby the tension of the spring may be regulated. Arranged on each side of this spring is a hanger or bracket 5, and between these hangers is pivoted by screws 7 a pair of arms 6, whose ends are connected together by cross-bars 8, thus making a rectangular frame, as shown in dotted lines in Fig. 2, the spring passing through the rectangular frame, so as not to interfere with the oscillation of the latter.

The scale-pan 9, instead of being supported upon a single stem, as heretofore, is supported upon two stems 10 11, which pass down through slots 12 in the upper side of the casing and which are elongated to permit of the lateral movement of the stems 10 11. The stem 11 is pivoted by means of a cross pin or bar 13 to the arms 6, the bar 13 being secured to the arms 6 by screws 14, having conical points fitting in complementary sockets in the ends of the bar 13 for the sake of reducing the friction to the minimum. The lower end of the stem 11 is pivoted in the same manner to a pair of arms 15, which are constructed like the arms 6, with the cross-bars 16 connecting them together, so as to form a rectangular frame, and which are pivoted in a pair of standards 17, mounted on the bottom of the casing 1, the arms 6 and 15 being parallel, so as to permit the stem 11 to rise and fall and maintain its perpendicular position. The purpose of these rectangular frames is obviously to provide the stem 11 with a firm support on both sides, while permitting it to rise and fall in its perpendicular position. The stem 10 is connected to the stem 11 by a cross-bar 18, which is rigidly secured to or formed integrally with the stems 10 11 and to which the lower end of the spring 2 is secured, so as to support both stems.

By this construction I find that there is little or no variation in the scale resulting from variation in the point on the scale-plate at which the weight is placed when being weighed.

The ends of the box or casing 1 are bowed or curved in the manner shown in Fig. 1, and each is provided with a slot 19 for the passage of the arms which carry the indexes 20. These index-arms, which are shown at 21 22, respectively, are secured to the cross-bars 16, which connect the arms 15 together, and are so formed and arranged that when the arms 15 are depressed by the weight on the scale-pan the index-arm 21 will descend, while the other, 22, will rise. In order that these index-arms 21 22 may simultaneously indicate the weight at both ends of the casing 1, I provide each of the bowed ends of the casing with the usual graduated scale 23 24, one of which, however, is arranged in the reverse order of the other, so that both arms 21 22 will simultaneously sweep from zero toward the higher numbers on the scale. In order that the arms 21 22 may make a sweep equal to the full extent of the scales 23 24 without causing the arms 6 15 to rise too near the perpendicular, the arm 21 is bent, as shown at 21$^a$, and the arm 22 is provided with the bend 22$^a$ and is also offset, as shown in plan in Fig. 2, in order that the slot 19 may be in the center of the scale-plate and interference with the stem 10 may be avoided. The scale-plates 23 and 24 are of course curved or bowed on an arc or arcs struck from the pivot upon which the index-arms oscillate.

The slots 19 are formed down the center of the scale-plates in order that the weight may be indicated on one side, while the other, which is shown in blank in the drawings, may be occupied by a scale of prices for the various articles to be weighed, thus simultaneously indicating the weight and computing the amount.

Having thus described my invention, what I claim as new therein, and desire to secure by Letters Patent, is—

1. A scale having in combination, a scale-pan-supporting stem, means for elastically supporting said stem, a pair of pivoted index-arms projecting in opposite directions and being attached to said stem whereby the movement of the latter will cause one to rise and the other to descend, and two scale-plates facing in opposite directions and having the graduations thereon arranged in the reverse order of each other, substantially as set forth.

2. A scale having in combination, a scale-pan-supporting stem, means for elastically supporting said stem, a pair of pivoted index-arms projecting in opposite directions and at an angle to each other and being attached to said stem whereby the movement of the latter will cause one of said arms to rise and the other to descend, and two scale-plates facing in opposite directions and having the graduations thereon arranged in the reverse order of each other, said index-arms being arranged normally one at the upper end of the graduations on one of said scale-plates and the other at the lower end of the graduations on the other of said scale-plates, substantially as set forth.

3. A scale having in combination, a scale-pan-supporting stem, means for elastically supporting said stem, a pair of pivoted index-arms projecting in opposite directions and being attached to said stem whereby the movement of the latter will cause one to rise and the other to descend, and two scale-plates facing in opposite directions and both being curved on arcs struck from the pivotal point of said index-arms, substantially as set forth.

ESSINGTON N. GILFILLAN.

Witnesses:
F. A. HOPKINS,
EDNA B. JOHNSON.